(12) United States Patent
Sharma et al.

(10) Patent No.: US 11,535,275 B2
(45) Date of Patent: Dec. 27, 2022

(54) DIGITAL MAP TRUTH MAINTENANCE

(71) Applicant: AT&T Intellectual Property I, L.P., Atlanta, GA (US)

(72) Inventors: Deva-Datta Sharma, San Ramon, CA (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

(21) Appl. No.: 16/876,430

(22) Filed: May 18, 2020

(65) Prior Publication Data
US 2021/0354724 A1 Nov. 18, 2021

(51) Int. Cl.
*G01C 21/36* (2006.01)
*G01C 21/00* (2006.01)
*B60W 60/00* (2020.01)

(52) U.S. Cl.
CPC .... *B60W 60/0011* (2020.02); *B60W 60/0025* (2020.02); *G01C 21/3605* (2013.01); *G01C 21/367* (2013.01); *G01C 21/3804* (2020.08); *G01C 21/3833* (2020.08)

(58) Field of Classification Search
CPC .......... B60W 60/0011; B60W 60/0025; G01C 21/3605; G01C 21/367; G01C 21/3804; G01C 21/3833; G01C 21/3841; G01C 21/3893; G01C 21/3856
See application file for complete search history.

(56) References Cited

U.S. PATENT DOCUMENTS

| | | | |
|---|---|---|---|
| 7,849,031 B2 | 12/2010 | Stehle et al. | |
| 8,717,387 B1 * | 5/2014 | Brewington | G06T 3/0075 345/619 |
| 9,204,257 B1 | 12/2015 | Mendelson | |
| 9,679,487 B1 | 6/2017 | Hayward | |
| 9,792,575 B2 | 10/2017 | Khasis | |
| 9,805,601 B1 | 10/2017 | Fields et al. | |
| 9,953,535 B1 | 4/2018 | Canavor et al. | |
| 9,961,507 B1 | 5/2018 | Mendelson | |
| 10,156,848 B1 | 12/2018 | Konrardy et al. | |
| 10,354,217 B2 | 7/2019 | Khasis | |
| 10,543,741 B2 | 1/2020 | Biderman et al. | |

(Continued)

OTHER PUBLICATIONS

"Comparison of satellite navigation software," https://en.wikipedia.org/wiki/Comparison_of_satellite_navigation_software, 4 pages.

(Continued)

*Primary Examiner* — Abby Y Lin
*Assistant Examiner* — Dylan Brandon Mooney
(74) *Attorney, Agent, or Firm* — Amin, Turocy & Watson, LLP

(57) ABSTRACT

The described technology is generally directed towards digital map truth maintenance. Map inputs shared among multiple users of a shared overlay map service can have a range of credibility, from not credible to highly credible. The disclosed digital map truth maintenance technologies can be used to enhance credibility of shared map inputs. Credibility values can be calculated for map inputs, based on any of multiple factors. Map inputs having sufficiently high credibility, such as a credibility value determined to be above a threshold value, can be shared among multiple mobile devices.

20 Claims, 10 Drawing Sheets

(56) References Cited

U.S. PATENT DOCUMENTS

| | | | |
|---|---|---|---|
| 10,611,475 B1* | 4/2020 | Durand | G06T 17/05 |
| 10,794,710 B1 | 10/2020 | Liu et al. | |
| 11,042,827 B2 | 6/2021 | Khasis | |
| 2003/0014187 A1 | 1/2003 | Chun et al. | |
| 2005/0099322 A1 | 5/2005 | Wainfan et al. | |
| 2007/0293958 A1 | 12/2007 | Stehle et al. | |
| 2011/0106592 A1 | 5/2011 | Stehle et al. | |
| 2011/0208417 A1 | 8/2011 | Fink et al. | |
| 2013/0030698 A1* | 1/2013 | Yamagishi | G01C 21/32 701/452 |
| 2014/0149032 A1* | 5/2014 | Barrett | G01C 21/32 701/409 |
| 2014/0244110 A1 | 8/2014 | Tharaldson et al. | |
| 2015/0032366 A1 | 1/2015 | Man et al. | |
| 2015/0073697 A1* | 3/2015 | Barrett | G01C 21/32 701/494 |
| 2015/0338234 A1* | 11/2015 | Seastrom | G01C 21/3679 701/409 |
| 2016/0012723 A1 | 1/2016 | Biderman et al. | |
| 2017/0098372 A1 | 4/2017 | Eilertsen | |
| 2017/0262790 A1 | 9/2017 | Khasis | |
| 2017/0284817 A1 | 10/2017 | Greenspan et al. | |
| 2017/0323249 A1 | 11/2017 | Khasis | |
| 2018/0017401 A1 | 1/2018 | Fletcher | |
| 2019/0004525 A1 | 1/2019 | Bills et al. | |
| 2019/0325376 A1 | 10/2019 | Khasis | |
| 2019/0332114 A1 | 10/2019 | Moroniti et al. | |
| 2019/0383624 A1 | 12/2019 | Magzimof et al. | |
| 2020/0166361 A1 | 5/2020 | Voznesensky et al. | |
| 2020/0372792 A1 | 11/2020 | Li et al. | |
| 2021/0004363 A1* | 1/2021 | Bailly | G01C 21/3848 |
| 2021/0035449 A1* | 2/2021 | Merfels | G08G 1/0104 |
| 2021/0285788 A1 | 9/2021 | Sharma et al. | |
| 2021/0312375 A1 | 10/2021 | Khasis | |
| 2021/0354724 A1 | 11/2021 | Sharma et al. | |

OTHER PUBLICATIONS

"Reason maintenance," https://en.wikipedia.org/wiki/Reason_maintenance, 3 pages.

"Digital Map Market worth $29.4 billion by 2024," https://www.marketsandmarkets.com/PressReleases/digital-map.asp, 6 pages.

Non-Final Office Action received for U.S. Appl. No. 16/846,883 dated Mar. 14, 2022, 64 pages.

Non-Final Office Action received for U.S. Appl. No. 16/815,333 dated Mar. 25, 2022, 55 pages.

Notice of Allowance received for U.S. Appl. No. 16/846,883 dated Jul. 1, 2022, 64 pages.

Final Office Action received for U.S. Appl. No. 16/815,333 dated Aug. 24, 2022, 68 pages.

* cited by examiner

DIGITAL MAP TRUTH MAINTENANCE

TECHNICAL FIELD

The subject application is related to digital navigational map technologies and communications, such as wireless communications, to interact with digital navigational maps, including fifth generation (5G) and subsequent generation cellular communication systems.

BACKGROUND

Digital navigational maps coupled with mobile device location technologies have revolutionized the way we navigate. Today's mobile devices can wirelessly access digital maps that represent virtually any location in the world. Furthermore, devices can plot current device locations on maps. Users can enter starting points and destinations to calculate navigation routes. Digital navigational maps can also show certain real-time information, such as traffic information and locations of car accidents.

However, further improvements in digital navigational maps remain to be developed. For instance, the business landscape for digital navigational maps is presently limited to a few major providers, such as GOOGLE® and APPLE®. These companies have proprietary digital navigational map systems which do not easily share information across platforms. The ability to share map information directly among map users is also limited and cumbersome. In most use cases, direct sharing of map information requires human involvement, such as the manual specification of a map location to be shared and a set of recipients.

A present difficulty in sharing map information is expected to present difficulties for unmanned ground vehicles (UGV), such as driverless cars and delivery robots, in particular. Proprietary systems can and likely will be developed to allow fleets of UGVs to communicate with one another, and such communications can comprise map information. However, additional efficiency and control, as well as meaningful public safety and convenience gains, can be realized from automated cross-platform sharing of map information among different fleets of UGVs.

The above-described background relating to digital navigational mapping technology is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
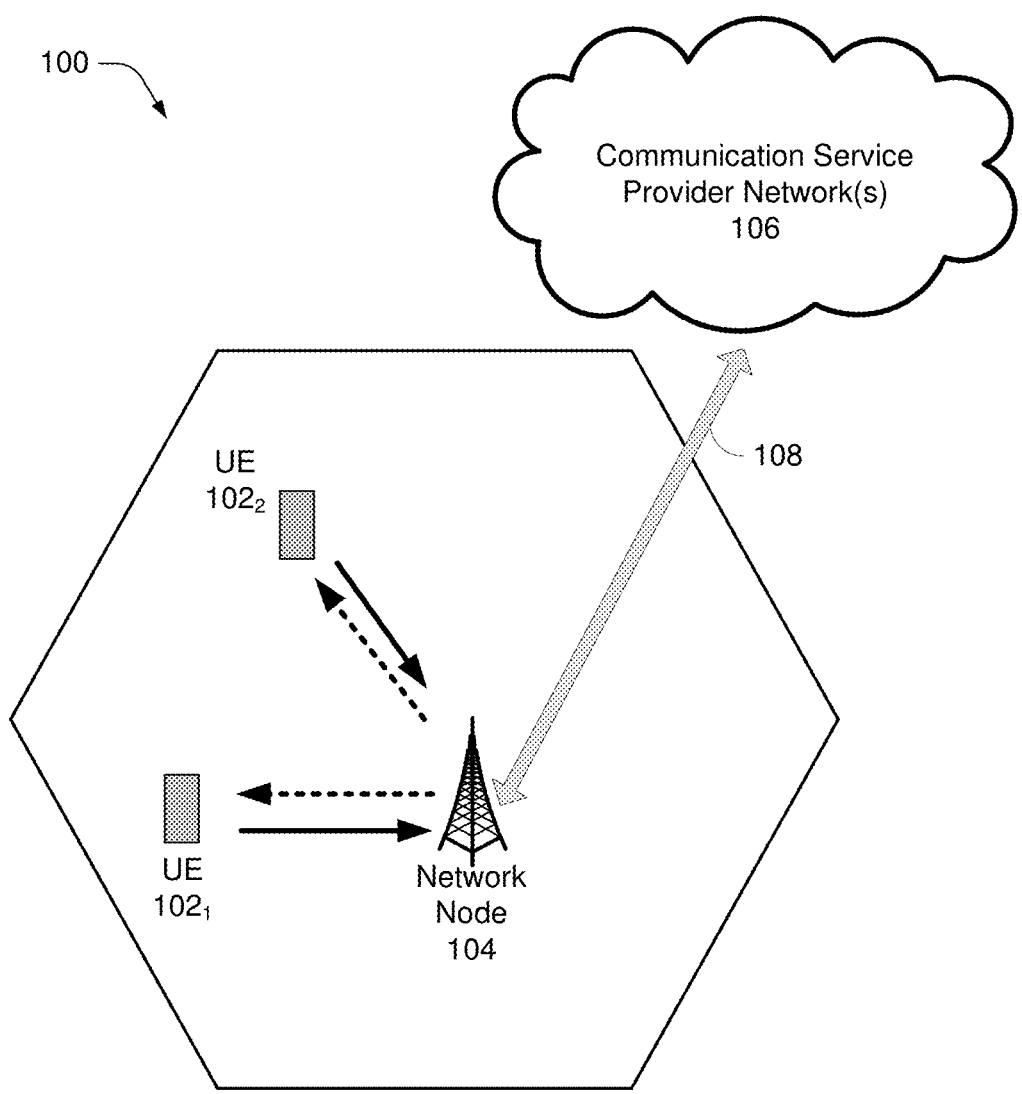
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards digital map truth maintenance. Map inputs shared among multiple users of a shared overlay map service can have a range of credibility, from not credible to highly credible. The disclosed digital map truth maintenance technologies can be used to enhance credibility of shared map inputs. Credibility values can be calculated for map inputs, based on any of multiple factors. Map inputs having sufficiently high credibility, such as a credibility value determined to be above a threshold value, can be shared among multiple mobile devices.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 1021, 1022, referred to collectively as UEs 102, a network node 104, and communication service provider network(s) 106.

In an example embodiment, mobile subscriber devices, such as UGVs, described herein, can be implemented as UEs 102. Alternatively, mobile subscriber devices can access a wireless communication system 100 through UEs 102. A map authority, also described herein, can be implemented as a server within communication service provider network(s) 106. Alternatively, the map authority described herein can be accessible via communication service provider network(s) 106, e.g., the map authority can be implemented as an Internet service accessible via a network connection between communication service provider network(s) 106 and the Internet.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
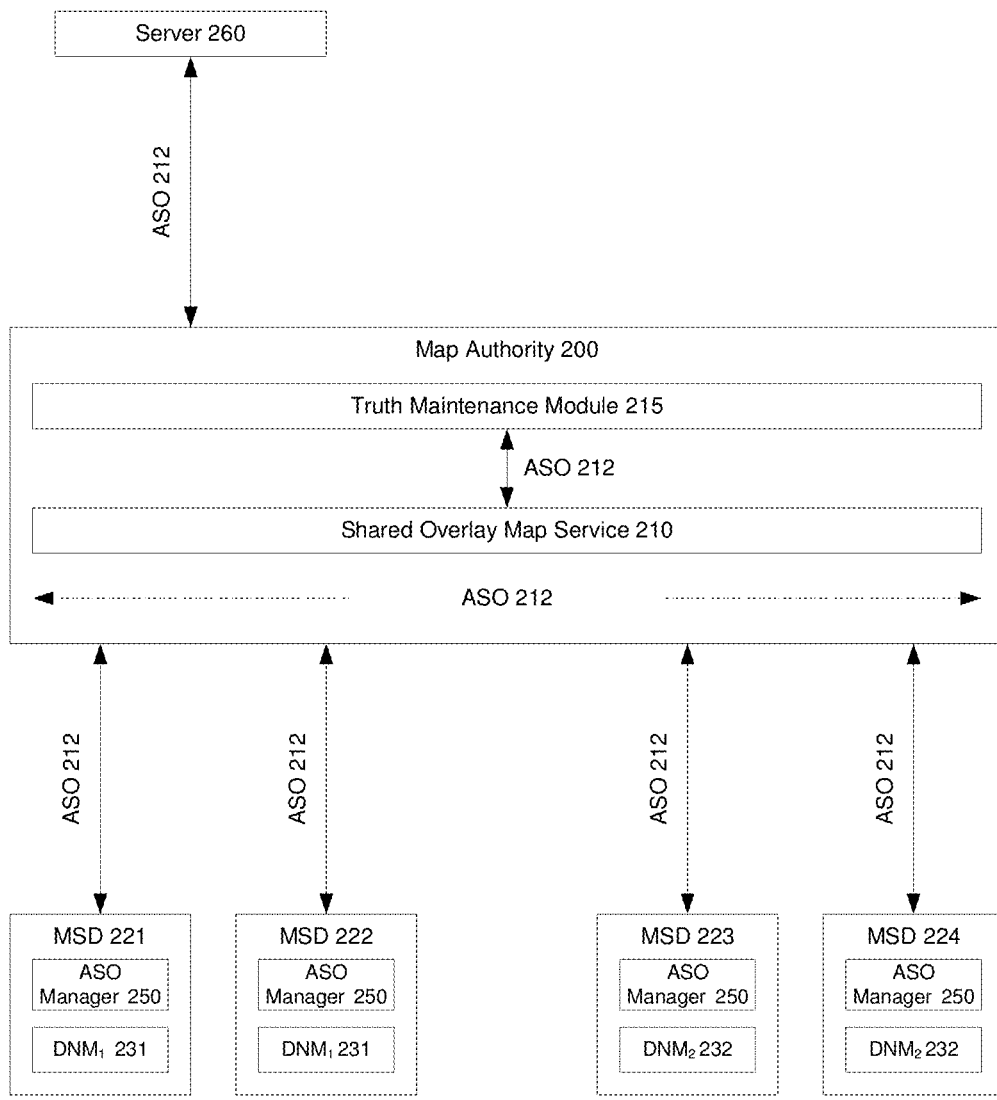
FIG. 2 illustrates an example map authority that hosts a shared overlay map service and a truth maintenance module, along with example subscriber devices that use the shared overlay map service, in accordance with various aspects and embodiments of the subject disclosure.

FIG. 2 illustrates an example map authority that hosts a shared overlay map service and a truth maintenance module, along with example subscriber devices that use the shared overlay map service, in accordance with various aspects and embodiments of the subject disclosure. FIG. 2 includes a map authority 200 comprising a shared overlay map service 210 and a truth maintenance module 215. The techniques disclosed herein can employ truth maintenance module 215 in conjunction with a shared overlay map service 210, however, the shared overlay map service 210 is not necessary for operation of the truth maintenance module 215, and in some embodiments, truth maintenance module 215 can be employed, e.g., in connection with other digital map technologies.

Figure 4:
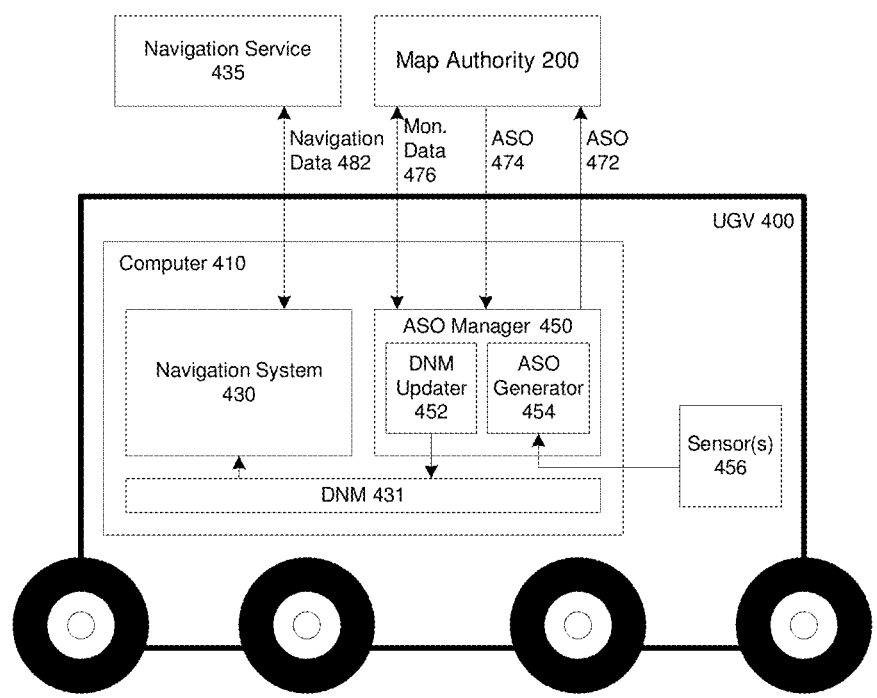
FIG. 4 illustrates an unmanned ground vehicle (UGV), as one example implementation of a mobile subscriber device, in accordance with various aspects and embodiments of the subject disclosure.

The illustrated subscriber devices 221, 222, 223, 224, and 260 comprise multiple example mobile subscriber devices (MSDs) 221, 222, 223, and 224, and a server 260. The server 260 provides an example subscriber device which is not necessarily mobile. In an embodiment, any of the MSDs 221, 222, 223, and 224 can be in the form of an unmanned ground vehicle (UGV), such as illustrated in FIG. 4, however, in other embodiments, MSDs 221, 222, 223, and 224 can comprise any mobile device equipped to use wireless communications and digital navigational maps. The server 260 can comprise, e.g. a government operated server that controls restricted areas for certain subscriber devices, such as UGVs. Embodiments of this disclosure allow rapid, flexible, and immediately effective deployment of different types of restriction zones to different types of subscriber devices, regardless of which specific navigation systems are employed at the subscriber devices.

In an example embodiment, the MSDs 221, 222, 223, and 224, and the server 260 can communicate with the shared overlay map service 210 via a wireless communication system 100 such as illustrated in FIG. 1. The MSDs 221, 222, 223, and 224, and the server 260 can send and receive map inputs, also referred to herein as active/smart overlays (ASOs), to and from the shared overlay map service 210. For example, any of the MSDs, e.g., MSD 221, can generate and send an ASO 212 to the shared overlay map service 210. The shared overlay map service 210 can receive the ASO 212, use the truth maintenance module 215 to check credibility of the ASO 212, and, when the ASO 212 is sufficiently credible, the shared overlay map service 210 can promulgate the ASO 212 to the multiple subscriber devices 221, 222, 223, 224, and 260. ASOs can also be referred to herein as map overlay information. In general, any of the MSDs 221, 222, 223, and 224, and the server 260 can send ASOs to the shared overlay map service 210, and the shared overlay map service 210 can promulgate received ASOs to some or all of the MSDs 221, 222, 223, 224, and the server 260.

The example MSDs 221, 222, 223, and 224 can each comprise a digital navigational map (DNM). In the illustrated example, some of the MSDs, namely, MSDs 221 and 222, comprise a first digital navigational map $DNM_1$ 231, while others of the MSDs, namely, MSDs 223 and 224, comprise a second digital navigational map $DNM_2$ 232. Furthermore, the example MSDs 221, 222, 223, and 224 can each comprise an ASO manager 250.

The ASO managers 250 can be configured to generate and send ASO updates to the shared overlay map service 210. The ASO managers 250 can furthermore be configured to receive ASOs, such as ASO 212, from the shared overlay map service 210, and the ASO managers 250 can be configured to associate received ASOs with the DNM, i.e., with either $DNM_1$ 231 or $DNM_2$ 232 depending on which of the DNMs is used by a MSD. The illustrated configuration allows sharing of ASOs while also permitting individual MSDs to use different DNMs, as well as using different navigation system software or other applications that interact with the different DNMs 231 and 232.

In general, the truth maintenance module 215 can be configured to filter map inputs such as ASO 212 based on credibility thereof, approving credible map inputs for promulgation to subscriber devices 221, 222, 223, 224, and 260, while blocking promulgation of non-credible or irrelevant map inputs.

DNMs such as Apple Maps®, Google Maps® and OpenStreetMap® are useful for individuals and UGVs alike. DNMs are also embedded in various devices, such as devices made by TomTom® and Garmin®. DNM users can update some DNMs by adding features and annotations that can be of interest to other users. However, such updates are presently limited to the specific vendor maps employed by the user's device. For example, users of Waze® can share updates with other users of Waze®, but not with users of other DNMs. The shared overlay maps described herein allow for sharing map updates across different DNM platforms.

User generated DNM annotations are preferably reliable and credible. Without restrictions on who can post annotations/updates to DNMs, and mechanisms to validate user DNM updates or assign different priority and confidence values to user updates, relevant user updates can potentially become lost in the noise of spurious user updates. For example, a user update such as "bush fire at intersection of Hwy 5 and Hwy 580," if shared by a fire department, should have both a high priority and confidence. A user update such as "see smoke in the direction of Hwy 5 while driving on Hwy 580 towards Hwy 5" by an anonymous individual is of less priority and confidence.

DNMs are used by various types of users, e.g., humans using special navigational devices such as TomTom®, self-driving cars, and UGVs (e.g., service robots). Using shared overlay maps, DNMs can be modified in real-time by users with annotations/content that can help other users. For example, a user might put an annotation/content about an oil spill at some location on a map, and the annotation can be pushed out to other users. Support for user generated annotations is a powerful capability; however, to be truly useful the resulting map should also be credible.

The truth maintenance module 215 can be configured to enhance credibility of user map inputs. A variety of techniques can be applied, individually or in combination. These techniques can include, for example: identifying a credibility of a user posting a map input, identifying a credibility of the map input itself, and identifying a credibility of a location and time at which the map input is reported.

Furthermore, the truth maintenance module 215 can be configured to remove map inputs after they are no longer relevant. For example, an annotation of an "oil spill" at location X can be removed after the spill condition has been cleared. Also, the truth maintenance module 215 can be configured to identify and consolidate duplicate map inputs. For example, a map input "fire hydrant broken at location X" and "water spill near location X" likely refer to a same event and are preferably reduced to one map input.

In some embodiments, the truth maintenance module 215 can incorporate truth maintenance system (TMS) technologies. TMS technologies can use algorithms to restore consistency of a knowledge representation. Example truth maintenance systems include single-context truth maintenance systems, multi-context truth maintenance systems, and multi-agent truth maintenance systems. In single context systems, consistency is maintained among all facts in memory. In multi-context systems, consistency can be maintained among subsets of facts in memory. In multi-agent truth maintenance systems, truth maintenance can be performed across multiple memories.

For the purpose of this disclosure, a knowledge representation maintained by the truth maintenance module 215 can be, e.g., a set of map properties (roads, buildings, bridges, etc.) and map inputs for a given map region. The truth maintenance module 215 can maintain consistency between previous credible knowledge and new credible knowledge through revision. If new credible knowledge contradicts the previous credible knowledge, then the knowledge representation can optionally be updated with the new credible knowledge.

The truth maintenance module 215 can maintain records in the form of a dependency network. Nodes in the dependency network can include entries in the knowledge representation. Arcs of the dependency network can include inference steps through which nodes were derived. Premises are fundamental beliefs which are assumed to be true. Premises do not need justifications, and form the basis from which justifications for other nodes can be derived.

Figure 5:
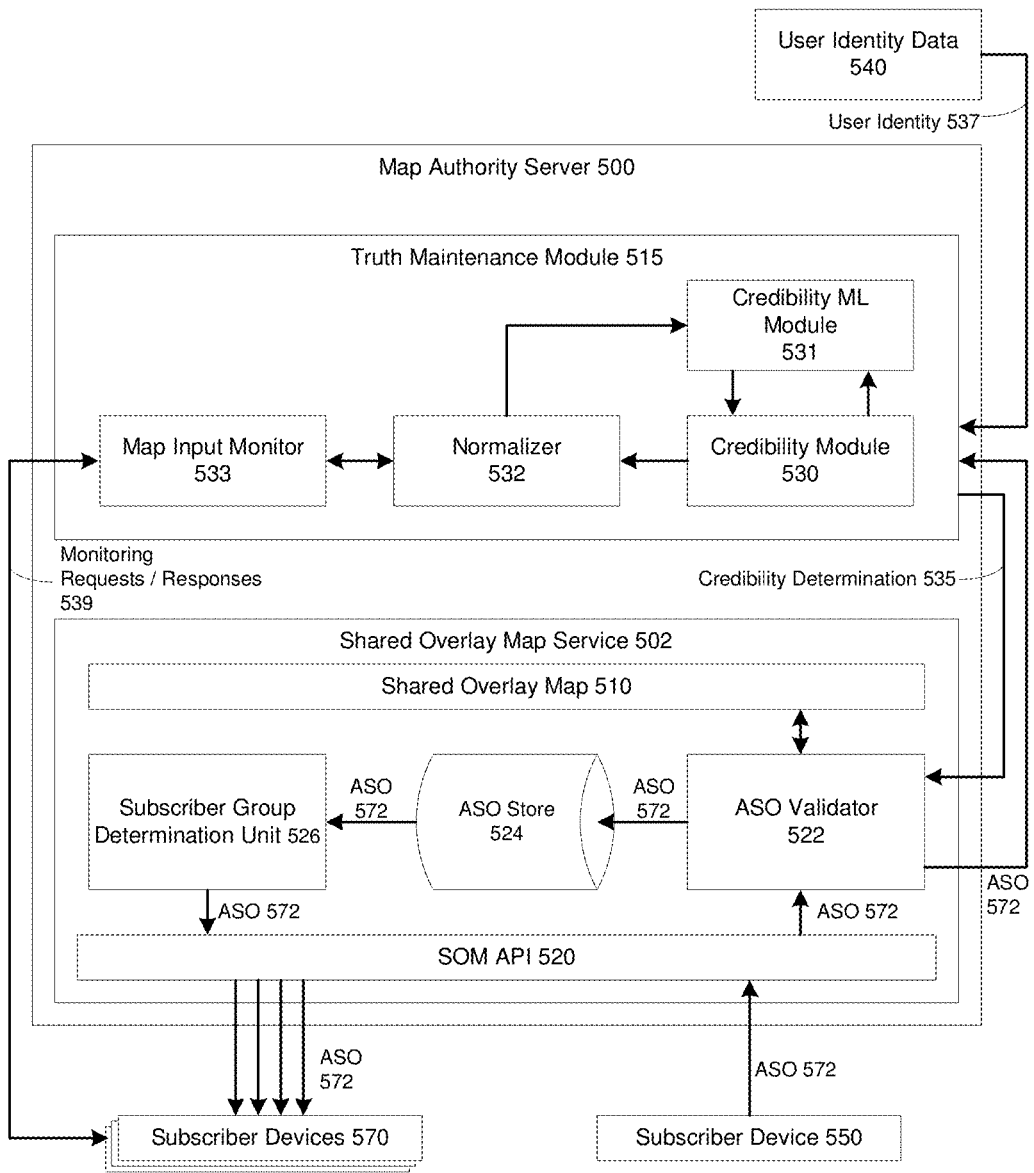
FIG. 5 illustrates an example map authority server, in accordance with various aspects and embodiments of the subject disclosure.

The truth maintenance module 215 can evaluate credibility of a given map input using information such as identity of a user (or device) who is posting the map input, location and time of map input generation, and correlation between the user and the map input, in particular whether the user has a qualification relevant to the map input. An example configuration of the truth maintenance module 215 is illustrated in FIG. 5.

Figure 3A:
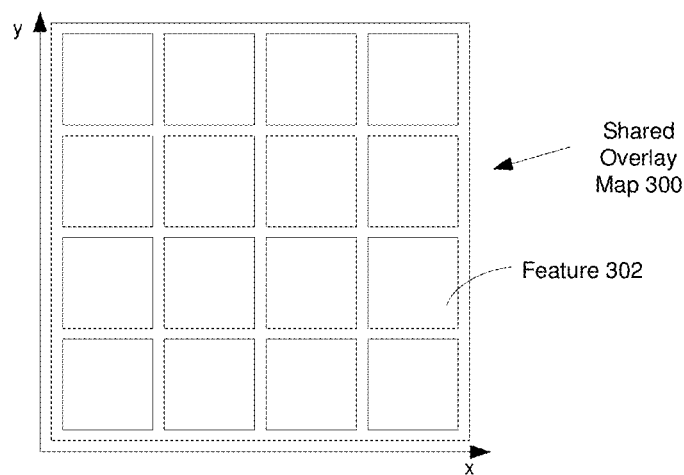
FIG. 3A illustrates an example shared overlay map for use by a shared overlay map service, in accordance with various aspects and embodiments of the subject disclosure.

FIG. 3A illustrates an example shared overlay map for use by a shared overlay map service, in accordance with various aspects and embodiments of the subject disclosure. The example shared overlay map 300 can include a coordinate system to define locations within the shared overlay map 300, and features such as example feature 302 with defined locations within the shared overlay map 300.

FIG. 3A includes an example Cartesian (x, y) type coordinate system, however, it will be appreciated that other coordinate systems can be used, such as polar coordinates, spherical coordinates, volumetric (x, y, z) coordinates, etc. In an embodiment, a shared overlay map service such as shared overlay map service 210 illustrated in FIG. 2 can include a shared overlay map 300 as a reference map, for use in connection with processing ASO updates 212.

In an example embodiment, the shared overlay map 300 can represent a city, and the illustrated features 302 can represent city blocks and city streets. In another example embodiment, the illustrated shared overlay map 300 can represent an indoor environment, e.g., inside a physical structure, and features 302 can represent, for example, hallways and rooms. The shared overlay map 300 can generally represent any terrain, and features 302 can represent any features.

Figure 3B:
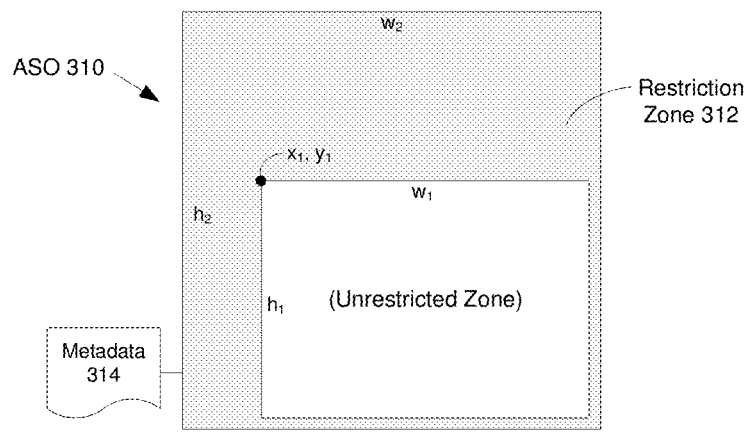
FIG. 3B illustrates an example map overlay that can be applied to the shared overlay map of FIG. 3A, in accordance with various aspects and embodiments of the subject disclosure.
Figure 6:
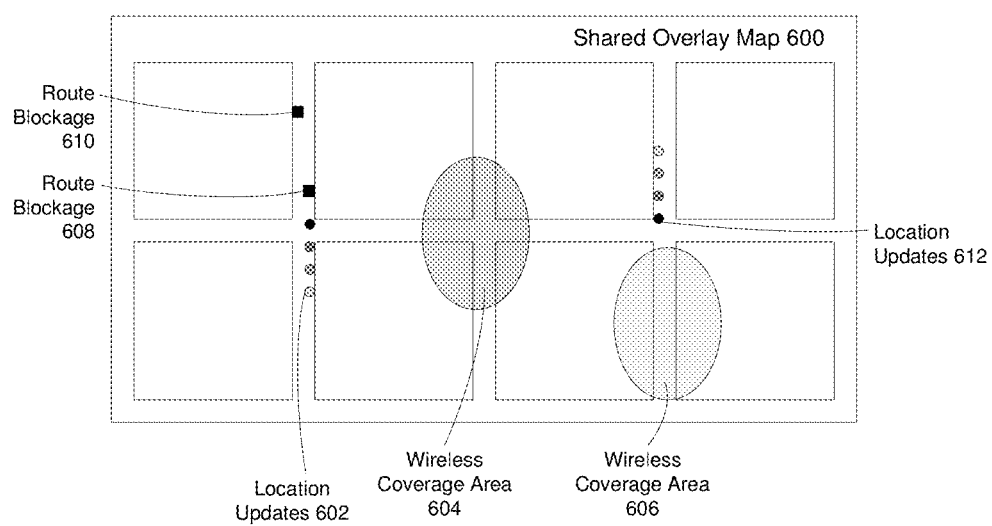
FIG. 6 illustrates an example shared overlay map and additional example map overlays, in accordance with various aspects and embodiments of the subject disclosure.

FIG. 3B illustrates an example map overlay (also referred to herein as a map input) that can be applied to the shared overlay map of FIG. 3A, in accordance with various aspects and embodiments of the subject disclosure. The example map overlay is implemented as ASO 310. The ASO 310 provides an example restriction zone map overlay to indicate a restriction zone 312 where mobile subscriber devices, e.g., MSDs 221, 222, 223, and 224, are not permitted to travel. The ASO 310 is one example of a map overlay, and a wide variety of other map overlays can be generated according to the teachings provided herein. Further example map overlays are illustrated in FIG. 6.

In FIG. 3B, the ASO 310 can include location information, e.g. the illustrated $x_1$, $y_1$ coordinate. The $x_1$, $y_1$ coordinate can reference, e.g., a coordinate of a location on the shared overlay map 300. The ASO 310 location information thereby includes location information to position the ASO 310 on the shared overlay map 300. Further location information, or else dimension information, such as the illustrated width and height dimensions (w2, h2) of the restriction zone 312 and the illustrated width and height dimensions (w1, h1) of the unrestricted zone, can be used to position further portions of the ASO 310 on the shared overlay map 300.

FIG. 3B furthermore illustrates metadata 314 which can be linked to the ASO 310 in some embodiments. The metadata 314 can optionally include any data desired to accompany the ASO 310. For example, the metadata 314 can include a time at which the ASO 310 was generated at a subscriber device, an identification of the subscriber device that generated the ASO 310, a location of the subscriber device at the time the subscriber device generated the ASO 310, and/or a wide variety of other information, such as photos and videos of the location where the ASO 310 was generated and sensor values of any sensors at the subscriber device when the ASO 310 was generated.

Figure 3C:
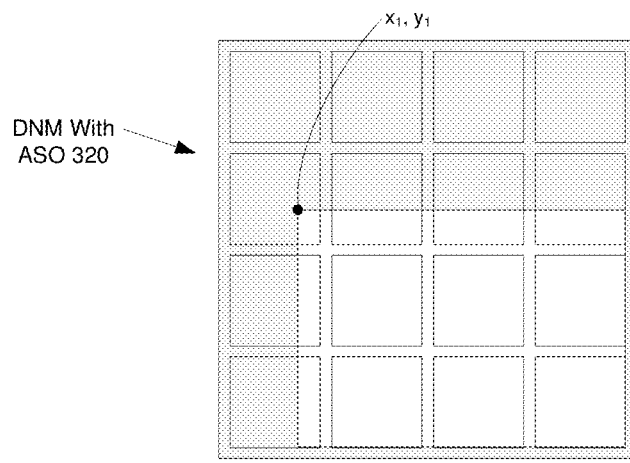
FIG. 3C illustrates an example combination of the map overlay illustrated in FIG. 3B with a digital navigational map at a mobile subscriber device, in accordance with various aspects and embodiments of the subject disclosure.

FIG. 3C illustrates an example combination of the map overlay illustrated in FIG. 3B with a digital navigational map at a mobile subscriber device, in accordance with various aspects and embodiments of the subject disclosure. FIG. 3C illustrates a DNM with ASO 320, wherein the map overlay ASO 310 of FIG. 3B is positioned on a DNM at a subscriber device.

In an example scenario according to FIG. 3C, a first subscriber device can generate the ASO 310 illustrated in FIG. 3B. The first subscriber device can upload the ASO 310 to a map authority including a shared overlay map 300 such as illustrated in FIG. 3A. The map authority can then promulgate the ASO 310 to multiple subscriber devices, each of the multiple subscriber devices including a DNM. At least one of the multiple subscriber devices can position the received ASO 310 on its DNM, in order to produce a DNM with ASO 320 such as illustrated in FIG. 3C. The coordinate x1, y1 can be translated as necessary, e.g., by an ASO manager 250, to correctly position the received ASO 310 on a subscriber device DNM. The subscriber device including the DNM with ASO 320 can then use the DNM with ASO 320 according to its own navigational procedures. For example, the subscriber device can avoid navigating into the restriction zone 312 and instead remain inside the boundaries of the unrestricted zone.

A map overlay such as ASO 310 can be generated by a governmental authority such as a city transportation authority. In such a scenario, the governmental authority is a highly credible user and the truth maintenance module 215 can assign the ASO 310 a high credibility value. As a result, the credibility value for ASO 310 can exceed any threshold credibility value used to filter low-credibility map inputs. The truth maintenance module 215 can approve promulgation of the ASO 310 by the shared overlay map service 210 to subscriber devices. In other circumstances, credibility may be more difficult to determine and may not be approved for promulgation, as will be described further herein.

FIG. 4 illustrates an unmanned ground vehicle (UGV), as one example implementation of a mobile subscriber device, in accordance with various aspects and embodiments of the subject disclosure. FIG. 4 includes example UGV 400, which can include, for example, a computer 410 and various sensors 456 inside a housing that rides on wheels. The computer 410 can communicate with remote devices, such as remote servers that host a navigation service 435 and a map authority 200, via a wireless communication system 100 such as illustrated in FIG. 1. The UGV 400 is one example implementation of an MSD such as MSD 221, introduced in FIG. 2.

The example computer 410 can be communicatively coupled with sensor(s) 456, and the computer 410 can comprise a navigation system 430, a DNM 431, and an ASO manager 450. The ASO manager 450 can comprise an ASO generator 454, and a DNM updater 452.

In an example operation of UGV 400, a sensor of sensor(s) 456 can detect an input, for example, a route blocking obstruction which prevents UGV 400 from navigating on its calculated route. The sensor can send the input to the ASO generator 454. The ASO generator 454 can generate a map overlay in the form of ASO 472, and the ASO manager 450 can upload the ASO 472 to the map authority 200. The map authority 200 can perform any modifications to ASO 472, thereby generating ASO 474, and the map authority 200 can promulgate the ASO 474 to multiple subscriber devices, such as UGVs. The ASO 474 can be received by UGV 400, that is, the same UGV 400 that originally generated ASO 472, as well as other subscriber devices.

The received ASO 474 can be processed by DNM updater 452. The DNM updater can update DNM 431 to include the received ASO 474. The navigation system 430 can then use the updated DNM 431, including ASO 474, in connection with route calculations for UGV 400. The navigation system 430 can for example communicate with navigation service 435, by sending and receiving navigation data 482. The navigation system 430 can be configured to recalculate routes for the UGV 400 in view of the received ASO 474.

In an alternative embodiment, UGV 400 can be equipped with limited local processing power, and some or all UGV 400 processing can be done remotely. A remote system, e.g., navigation service 435, can provide any of the UGV 400 processing functions illustrated in FIG. 4, including the communications with the map authority 200, and the navigation service 435 can send navigation commands wirelessly to the UGV 400.

Sensor(s) 456 can optionally comprise, for example, machine vision sensors, such as cameras, lasers, sonar, radar and/or LIDAR, acoustic sensors such as a microphone, wireless signal sensors such as antennae to measure wireless signal strengths, including cellular radio signals and Wi-Fi, location sensors such as global positioning system (GPS) units, accelerometers, pressure sensors, or any other sensors.

In some embodiments, a sensor input can be inserted directly into information for a generated ASO 472. For example, ASO generator 454 can include a wireless signal strength measurement, or a detected location of the UGV 400, in an ASO 472, along with shared overlay map 300 location information or other metadata 314. In other embodiments, computer 410 can include software to process sensor inputs to determine appropriate map overlay information to include in an ASO 472. For example, a multifactor analysis, based in part on machine vision sensor inputs and/or other sensor inputs, can be performed at computer 410 to conclude that a route blockage exists which prevents the UGV 400 from traveling an intended route. ASO generator 454 can place a route blockage determination, optionally along with supporting sensor inputs, in an ASO 472 to be sent to the map authority 200.

Map inputs generated by robotic subscriber devices, such as UGV 400, can optionally be processed separately by the truth maintenance module 215, that is, by different truth maintenance processing functions than used for human generated map inputs. A UGV map input such as ASO 472 can generally be treated as highly credible, however, there is also a high probability that the map input may be duplicative or irrelevant. Truth maintenance module 215A can optionally include robot map input processing for assigning credibility values to robot generated map inputs.

In some embodiments, a subscriber device such as UGV 400 can furthermore be configured to send and receive monitoring data 476. The monitoring data 476 can include monitoring requests from the map authority 200, and monitoring responses (responses to monitoring requests) generated at UGV 400. For example, the map authority 200 may send a monitoring request for a photograph of a particular location. The ASO manager 450 can be configured to take the requested photograph and send it to map authority 200 as monitoring data 476. Monitoring requests and responses are described further in connection with FIG. 5.

FIG. 5 illustrates an example map authority server, in accordance with various aspects and embodiments of the subject disclosure. The illustrated example map authority server 500 can include a shared overlay map service 502 and a truth maintenance module 515. In an embodiment, the map authority server 500 can implement a map authority 200 such as illustrated in FIG. 2, the shared overlay map service 502 can implement a shared overlay map service 210 such as illustrated in FIG. 2, and the truth maintenance module 515 can implement a truth maintenance module 215 such as illustrated in FIG. 2.

The map authority server 500 can communicate with subscriber devices 570 and subscriber device 550 via a wireless communication system 100 such as illustrated in FIG. 1. The subscriber devices 570 and 550 can include, e.g., UGVs such as example UGV 400 illustrated in FIG. 4. Otherwise, subscriber devices 570 and 550 can be implemented by any mobile devices, including mobile telephones, tablets, self-driving cars, and other mobile devices. In some embodiments, subscriber devices 570 and 550 can also include one or more stationary devices, e.g., a stationary server 260 such as illustrated in FIG. 2.

The example shared overlay map service 502 can include a shared overlay map 510, a shared overlay map (SOM) application programming interface (API) 520, an ASO validator 522, an ASO store 524, and a subscriber group determination unit 526. The shared overlay map 510 can implement at shared overlay map 300 such as illustrated in FIG. 3A. The various components of the shared overlay map service 502 are described below in connection with example operations of the shared overlay map service 502.

The example truth maintenance module 515 can include a credibility module 530, a credibility machine learning (ML) module 531, a normalizer 532, and a map input monitor 533. The credibility module 530 can retrieve user identity information from user identity data 540. The various components of the truth maintenance module 515 are described below in connection with example operations of the truth maintenance module 515.

In an example operation sequence, an incoming ASO 572 can be received at SOM API 520 from a subscriber device 550. The SOM API 520 can expose a network API supporting automated accesses to the shared overlay map service 502 by subscriber devices 570 and 550. The SOM API 520 can pass the received ASO 572 to ASO validator 522. The ASO validator 522 can process the ASO 572 to ensure ASO 572 complies with shared overlay map service 502 requirements. The ASO validator 522 can pass ASO 572 to the truth maintenance module 515, and the truth maintenance module 515 can return a credibility determination 535. In an embodiment, the credibility determination 535 can comprise a YES/NO determination of whether the ASO 572 is credible or not. The shared overlay map service 502 can be configured to further process and promulgate credible ASOs, while deferring or declining promulgation of non-credible ASOs. Other example requirements that can be enforced by ASO validator 522 include timeliness requirements, data structure requirements, data completeness requirements, subscriber device identification requirements, or other requirements as may be appropriate for particular embodiments.

The ASO validator 522 can optionally modify the ASO 572. The ASO validator 522 can use the shared overlay map 510 in connection with processing the ASO 572, for example, to refine or otherwise modify location information included in ASO 572, or to check redundancy of ASO 572 with other ASOs in the ASO store 524. Once the ASO 572 is validated, the ASO validator 522 can store the ASO 572 along with other ASOs in the ASO store 524.

The subscriber group determination unit 526 can determine a subscriber group, namely, a group of the subscriber devices 570, to receive the ASO 572. In some embodiments, the subscriber devices 570 can be divided into different groups, and an ASO originating from any subscriber device within a particular subscriber group can be promulgated to the other subscriber devices of the same particular subscriber group.

In other embodiments, the subscriber group determination unit 526 can determine an appropriate group of subscriber devices 570 for each ASO 572. The group of subscriber devices 570 can be determined based on relevance of the ASO 572 to the subscriber devices 570. For example, an ASO including a UGV restriction zone may be relevant to only UGV type subscriber devices, and so the subscriber group determination unit 526 can send such a restriction zone ASO to only UGV subscriber devices. Subscriber device type and subscriber device ASO preferences can optionally be gathered by shared overlay map service 502 during a subscriber device enrollment process, and subscriber device information can be provided to subscriber group determination unit 526 for use in determining a group of subscriber devices 570 for each new ASO 572.

The subscriber group determination unit 526 can pass subscriber device group information to SOM API 520, and the SOM API 520 can send ASO 572 to the group of subscriber devices 570.

The operations of the truth maintenance module 515 can include determining and supplying credibility determination 535 with regard to ASO 572. In an example, ASO 572 can include a report from subscriber device 550 of a smoke cloud indicating a possible fire at a location. The ASO 572 can initially be received at the credibility module 530, and the credibility module 530 can be configured to assign the credibility determination 535 to the ASO 572 and return the credibility determination 535 to the shared overlay map service 502.

The credibility module 530 can calculate the credibility determination 535 based on one or more credibility factors, including, e.g., a location and time of the subscriber device 550 when the ASO 572 was generated; a user identity associated with a user of the subscriber device 550, a profile of the user identity of a user of the subscriber device 550, a credibility score associated with the user identity of the user of the subscriber device 550, a nature of the event described in ASP 570, and any correlation between the nature of the event and the profile of the user identity.

In an embodiment, the credibility module 530 can retrieve a user identity 537 corresponding to the ASO 572, e.g., where the user identity 537 is that of a user associated with subscriber device 550. In the illustrated embodiment, the credibility module obtains the user identity 537 from an external source, e.g., a communication service provider database. In our example, different credibility values can be associated with different user identities. Furthermore, higher credibility values can be assigned to ASOs when a user identity 537 includes a credential related to the content of the ASO 572, e.g., where user identity 537 indicates that the user is a fire department employee, and lower credibility values can be assigned to ASOs when a user identity 537 does not include a credential related to the content of the ASO 572.

The credibility module 530 can operate in conjunction with the normalizer 532. In an embodiment, the ASO 572 can be furthermore processed by the normalizer 532. The normalizer 532 can be configured to account for multiple events in a geographical area. For example, functions of the normalizer 532 can include: resolving conflicts between two or more reported events; consolidating multiple reports of a same event; and assigning a confidence factor to ASO 572 based on a number of confirming reports as well as similarity of the confirming reports.

In some embodiments, the normalizer 532 can be configured to generate a new, high credibility ASO based on multiple received ASOs such as ASO 572. The high credibility ASO can be provided to the shared overlay map service 502, e.g., in lieu of credibility determination 535, and the shared overlay map service 502 can promulgate the high credibility ASO to subscriber devices 570 in lieu of one or more individual ASOs, such as ASO 572.

In some embodiments, the truth maintenance module 515 and/or the normalizer 532 can be configured to employ a map input monitor 533 to gather further information about ASOs. The map input monitor 533 can be configured to send and receive monitoring requests/responses 539 to selected devices of subscriber devices 570, namely, to devices in the vicinity of an event described in an ASO 572. The monitoring requests can request validation and/or status of a reported event, and the monitoring responses can provide such validation and/or status information.

In some embodiments, the truth maintenance module 515 can be configured to employ a credibility machine learning (ML) module 531. The credibility ML module 531 can use credibility information from normalizer 532 and credibility module 530 to improve future credibility determinations, e.g. by updating credibility data associated with different user identities, based on previous credibility determinations.

FIG. 6 illustrates an example shared overlay map and additional example map overlays, in accordance with various aspects and embodiments of the subject disclosure. The shared overlay map 600 can include an implementation of the shared overlay map 510 illustrated in FIG. 5, or the shared overlay map 300 illustrated in FIG. 3. Several example map overlays are illustrated on the shared overlay map 600. The illustrated map overlays can be generated using data from ASOs or navigation advisories described herein. This disclosure provides example map overlays, and further map overlays can be generated with the benefit of this disclosure, and credibility of received map overlays can be evaluated according the techniques described herein.

Some map overlays can comprise location updates, such as location updates 602 and location updates 612. In an embodiment, subscriber devices such as UGVs can send ASOs comprising location updates indicating current locations of the subscriber devices. A first UGV can send location updates 602, while a second UGV can send location updates 612. The location updates 602 and 612 can optionally be sent periodically, or else, as a function of UGV displacement since a previous location update. The location updates 602 and 612 are illustrated in FIG. 6 as a time series of updates, with older location updates progressively fading away. In an implementation, a map authority can optionally store location histories of location updates 602 and 612, and can optionally promulgate a limited amount of location history information to subscriber devices, in addition to current subscriber device locations. Location history can be useful for example to allow UGV subscriber devices to determine speed and direction of travel of other UGVs.

Information such as location updates 602 and 612, especially from robots such as UGVs, is an example of highly credible information which can receive a high credibility score. Location information is generally easy to determine by a subscriber device and is not prone to human judgement or interpretation error.

Some map overlays can include wireless coverage information, such as wireless coverage area 604 and wireless coverage area 606. Wireless coverage areas can potentially overlap. Map inputs comprising wireless coverage information can include, for example, wireless signal identification information and measured wireless signal strength at different locations within the shared overlay map 600. In an embodiment, wireless coverage area 604 can comprise a region associated with a first wireless signal, and wireless coverage area 606 can comprise a region associated with a second wireless signal. Alternatively, wireless coverage area 604 can comprise a region of strong wireless signal strength, while wireless coverage area 606 can comprise a region of limited or no wireless signal strength. The measured wireless signals can comprise, e.g., cellular radio signals, Wi-Fi signals, or other wireless signals. Some UGVs make heavy, near continuous use of wireless communications, and so wireless coverage information can affect navigation route decisions. Like location updates, wireless coverage information can be assigned high credibility values in some embodiments.

Some map overlays can comprise route blockage information, for example, route blockage 610 and route blockage 608. Route blockage information can comprise an indication that travel is blocked at a location on the shared overlay map 600. Route blockage information can optionally specify a portion of a road or sidewalk and/or a direction of travel which is blocked. Furthermore, route blockage information can comprise any information, such as sensor values, pertaining to the route blockage. For example, a route can be blocked due to long term blockage such as construction, or due to short term blockage such as a safety operation, e.g., a car accident response. Route blockage information is generally less credible when received from a UGV subscriber, while it may be more credible when received from a human user, especially if the user location is at the route blockage or displays a location history leading to the route blockage, such as location updates 602 leading to route blockage 608. If received from a police officer or transportation official, route blockage information can be highly credible In addition to the example map overlays described herein, some embodiments can be configured to support map overlay annotations. Map overlay annotations can comprise a lightweight annotation to an ASO, to provide some further relevant information for the map overlay. Map overlay annotations can be handled similarly to the map overlays themselves, i.e., generated at a subscriber device, sent to a shared overlay map service, and them promulgated to multiple other subscriber devices.

The map overlays illustrated in FIG. 6, e.g., the location updates 612, can be generated by mobile subscriber devices, sent to a shared overlay map service, evaluated by a truth maintenance module, and, if credible, promulgated by the shared overlay map service to a plurality of mobile subscriber devices. Other map overlays, e.g., the restriction zone map overlay illustrated in FIG. 3B, can be generated by a stationary server, such as server 260, sent to a shared overlay map service, optionally evaluated by a truth maintenance module, and, if credible, promulgated by the shared overlay map service to a plurality of mobile subscriber devices.

Figure 7:
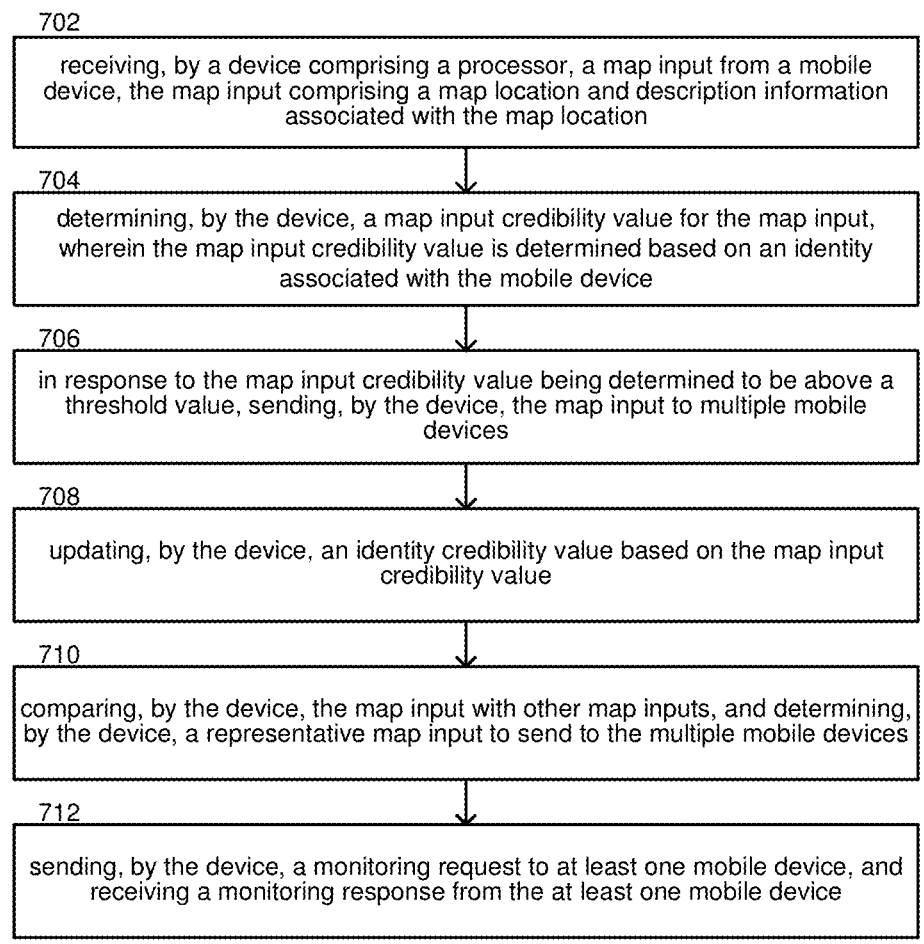
FIG. 7 is a flow diagram representing example operations of a server comprising a truth maintenance module for map inputs, in accordance with various aspects and embodiments of the subject disclosure.

FIG. 7 is a flow diagram representing example operations of a server comprising a truth maintenance module for map inputs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a map authority server 500 comprising a truth maintenance module 515, as illustrated in FIG. 5. In some embodiments, the map authority server 500 can comprise an indoor shared overlay map service for a physical structure, such as an office building, a sports arena, or a warehouse, and the mobile subscriber devices can comprise mobile subscriber devices inside the physical structure. For multi-story buildings and buildings with underground spaces such as parking garages and the like, the technologies provided herein can be implemented in three dimensions (3D). An example computing device that can provide the map authority server for an indoor shared overlay map service is a multi-access edge computer (MEC) in a wireless communication system 100 such as illustrated in FIG. 1.

In other embodiments, map authority server 500 can comprise an outdoor shared overlay map service for an outdoor area such as a city. The mobile subscriber devices can comprise mobile subscriber devices inside the city. An example computing device that can provide the map authority server for a city shared overlay map service is a RAN intelligent controller (RIC) in a wireless communication system 100 such as illustrated in FIG. 1.

Example operations include operation 702, which represents receiving, by a device comprising a processor, e.g., by server 500, a map input such as ASO 572 from a mobile device such as subscriber device 550, the map input comprising a map location and description information associated with the map location. At 704, the device 500 can determine a map input credibility value, such as credibility determination 535, for the map input, e.g. by processing ASO 572 at the truth maintenance module 515. The map input credibility value can be determined based on an identity, such as user identity 537, which is associated with the mobile device 550. At 706, in response to the map input credibility value being determined to be above a threshold value, the device 500 can send the map input, e.g., the ASO 572, to multiple mobile devices 570.

In an embodiment, the truth maintenance module 515 can calculate the credibility value by combining credibility values associated with different credibility factors. If the combined credibility value is above a threshold, then the map input (ASO 572) is sufficiently credible to promulgate. If not, then the ASO 572 can be withheld from promulgation. The credibility value can be determined based on any of the factors described herein or otherwise. For example, a credibility value can be determined based on proximity of a location of the mobile device 550 with the map location included in the ASO 572. Credibility value can be determined based on a time difference between a first time, e.g., a time included in the description information of ASO 572, and a second time, e.g., a time associated with a transmission of the ASO 572 to the map authority server 500. Credibility value can be determined based on whether the identity associated with the mobile device 550 (e.g., as may be indicated in ASO 572) matches an identity, e.g., user identity 537, which is accessible by the map authority server 500. Credibility value can be determined based on an output of a comparison of the map input with profile information associated with an identity such as user identity 537, for example, credibility can be higher when profile information matches content of the ASO 572.

Credibility value can also optionally be determined based on an identity credibility value assigned to the identity, e.g., user identity 537, accessible by the device 500. At 708, the credibility ML module 532 at device 500 can furthermore update the identity credibility value assigned to the identity 537 in user identity data 540, based on the map input credibility value applied to ASO 572.

At 710, the device 500 can compare the map input/ASO 572 with other map inputs, and the device 500 can determine a representative map input to send to the multiple mobile devices 570. Operation 710 can be performed by normalizer 532. Normalizer 532 can thereby eliminate duplicate ASOs and improve accuracy of the representative ASO based on consensus of multiple incoming ASOs.

At 712, the device 500 can send a monitoring request 539 to at least one mobile device of mobile devices 570, and the device 500 can receive a monitoring response 539 from the at least one mobile device. For example, map input monitor 533 can send a monitoring request 539 to at least one mobile device of subscriber devices 570, the monitoring request comprising a request for an update of the map input 572. The map input monitor 533 can subsequently receive from the at least one mobile device, in response to the monitoring request, the update of the map input 572. The map input monitor 533 can modify the map input 572 in response to receiving the update of the map input. The modified map input, e.g., an updated version of ASO 572, can be sent to the multiple mobile devices 570.

Figure 8:
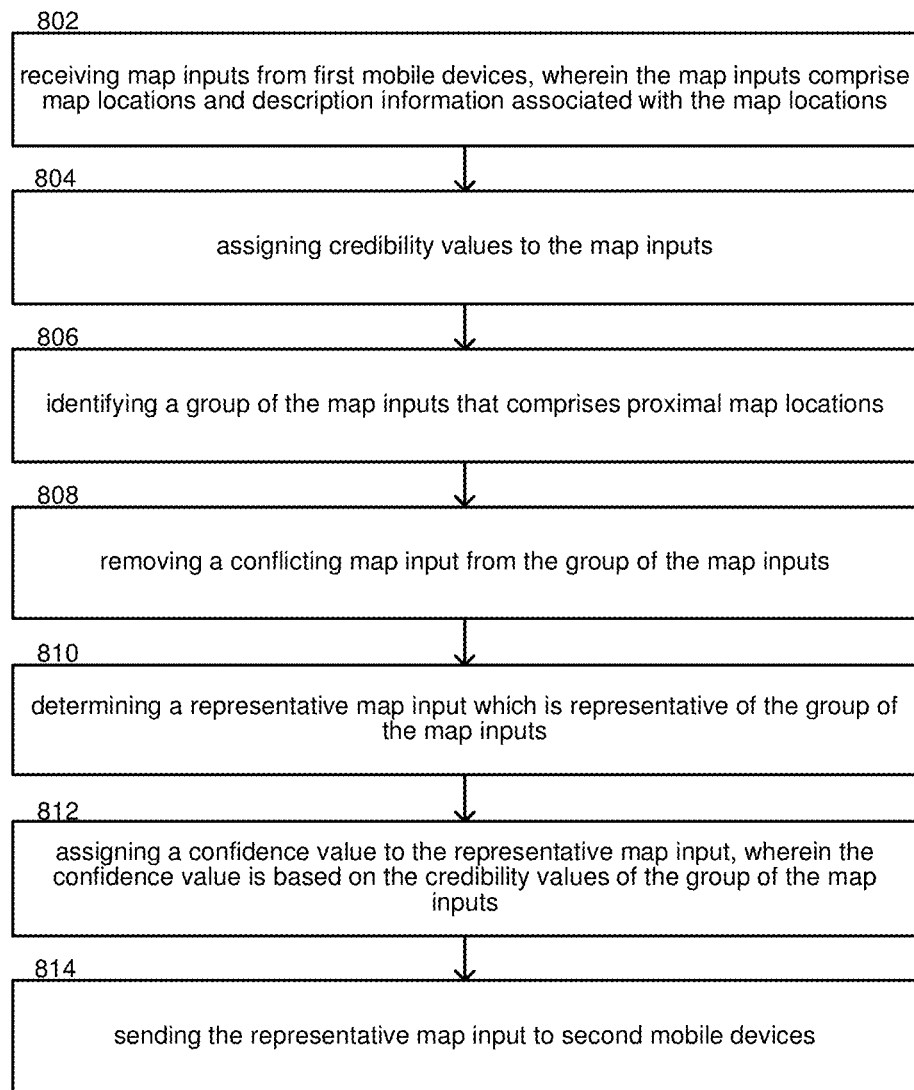
FIG. 8 is a flow diagram representing another example set of operations of a server comprising a truth maintenance module for map inputs, in accordance with various aspects and embodiments of the subject disclosure.

FIG. 8 is a flow diagram representing another example set of operations of a server comprising a truth maintenance module for map inputs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a map authority server 500 comprising a truth maintenance module 515, as illustrated in FIG. 5. Example operations include operation 802, which represents receiving map inputs such as ASO 572 from first mobile devices such as subscriber device 550, wherein the map inputs 572 comprise map locations and description information associated with the map locations.

At operation 804, truth maintenance module 515 can assign credibility values to map inputs. For example, the credibility module 530 can assign credibility values to the map inputs such as ASO 572, based on credibility values associated with user identities stored in user identity data 540, or other data associated with the map inputs. In some embodiments, map inputs having sufficiently high credibility values, e.g., having credibility values that have been determined to exceed a threshold credibility value, can be passed to the normalizer 532 for consolidation.

At operations 806-812, truth maintenance module 515 can consolidate map inputs. At 806, the normalizer 532 can identify a group of the map inputs that comprises proximal map locations. For example, the normalizer 532 can identify a group of ASOs, including ASO 572 and other received ASOs, which comprise proximal map locations. The group of map inputs can optionally furthermore comprise matching or otherwise similar description information. At 808, the normalizer 532 can furthermore optionally remove a conflicting map input from the group of the map inputs. The conflicting map input can comprise, e.g., conflicting description information that conflicts with description information of other map inputs in the group. At 810, the normalizer 532 can determine a representative map input which is representative of the group of the map inputs. For example, the representative map input can comprise a representative map location based on the proximal map locations of the group of the map inputs, and the representative map input can comprise representative description information based on description information in the group of the map inputs. At 812, the normalizer 532 can assign a confidence value to the representative map input, wherein the confidence value is based on the credibility values of the group of the map inputs. For example, the representative map input can comprise an average or mean confidence value of the group of the map inputs, optionally increased in view of the knowledge of multiple agreeing map inputs.

At operation 814, the server 500 can send the representative map input to second mobile devices, e.g., to subscriber devices 570. In the illustrated embodiment, the representative map input can be provided to the shared overlay map service 502 in lieu of, or in addition to, credibility determination 535, and the representative map input can be distributed to multiple mobile devices 570 by the shared overlay map service 502.

Figure 9:
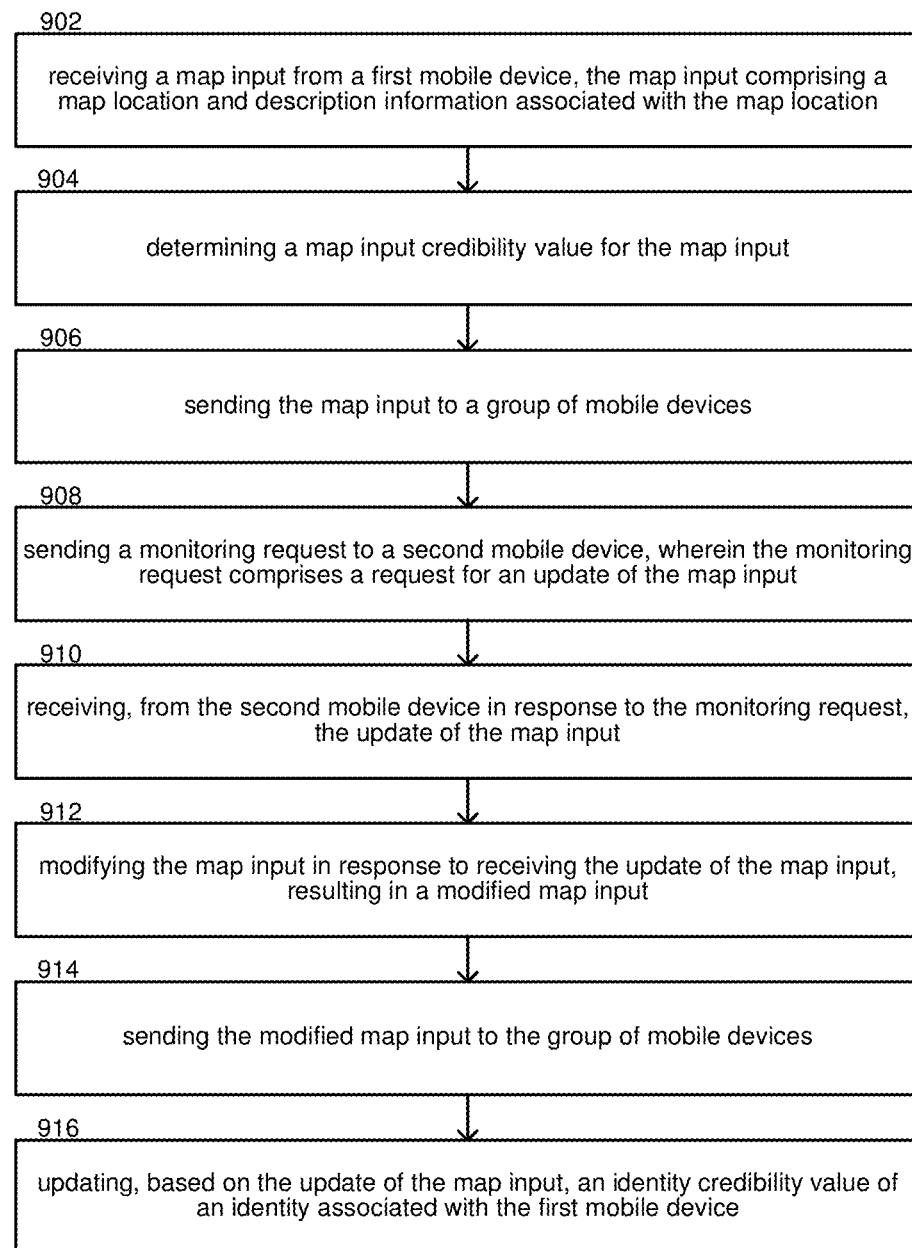
FIG. 9 is a flow diagram representing another example set of operations of a server comprising a truth maintenance module for map inputs, in accordance with various aspects and embodiments of the subject disclosure.

FIG. 9 is a flow diagram representing another example set of operations of a server comprising a truth maintenance module for map inputs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a map authority server 500 comprising a truth maintenance module 515, as illustrated in FIG. 5. At operation 902, the server 500 can receive a map input, such as ASO 572, from a first mobile device, e.g., from subscriber device 550. The map input can comprise a map location and description information associated with the map location. At operation 904, the truth maintenance module 515 can determine a map input credibility value for the map input, e.g., credibility determination 535 can be determined for ASO 572. At 906, the server 500 can send the map input, namely ASO 572, to a group of mobile devices such as subscriber devices 570.

The group of mobile devices can, although need not necessarily, comprise UE devices, UGVs, or any other mobile devices.

Operations 908-914 pertain to the further use of monitoring requests. At 908, the server 500 can send a monitoring request 539 to a second mobile device, e.g., to one or more of subscriber devices 570. The monitoring request 539 can comprise a request for an update of the map input, i.e., an update of ASO 572 which was sent to subscriber devices 570 at operation 906. At 910, the server 500 can receive, from the second mobile device in response to the monitoring request 539, a monitoring response (also labeled 539 in FIG. 5) comprising the update of the map input. At 912, the server 500 can modify the map input, namely the ASO 572, in response to receiving the update of the map input, resulting in a modified map input. At 914, the server 500 can send the modified map input (a modified ASO 572) to the group of mobile devices, i.e., to subscriber devices 570. The modified ASO can include information to cancel or delete the original ASO 572, or information to modify any of the data included in the original ASO 572.

At 916, the server 500 can update, based on the update of the map input, an identity credibility value of an identity associated with the first mobile device. For example, the server 500 can update, based on the update of the map input included in monitoring response 539, an identity credibility value of an identity stored in user identity data 540, wherein the identity is associated with the subscriber device 550 that initially supplied the ASO 572.

Figure 10:
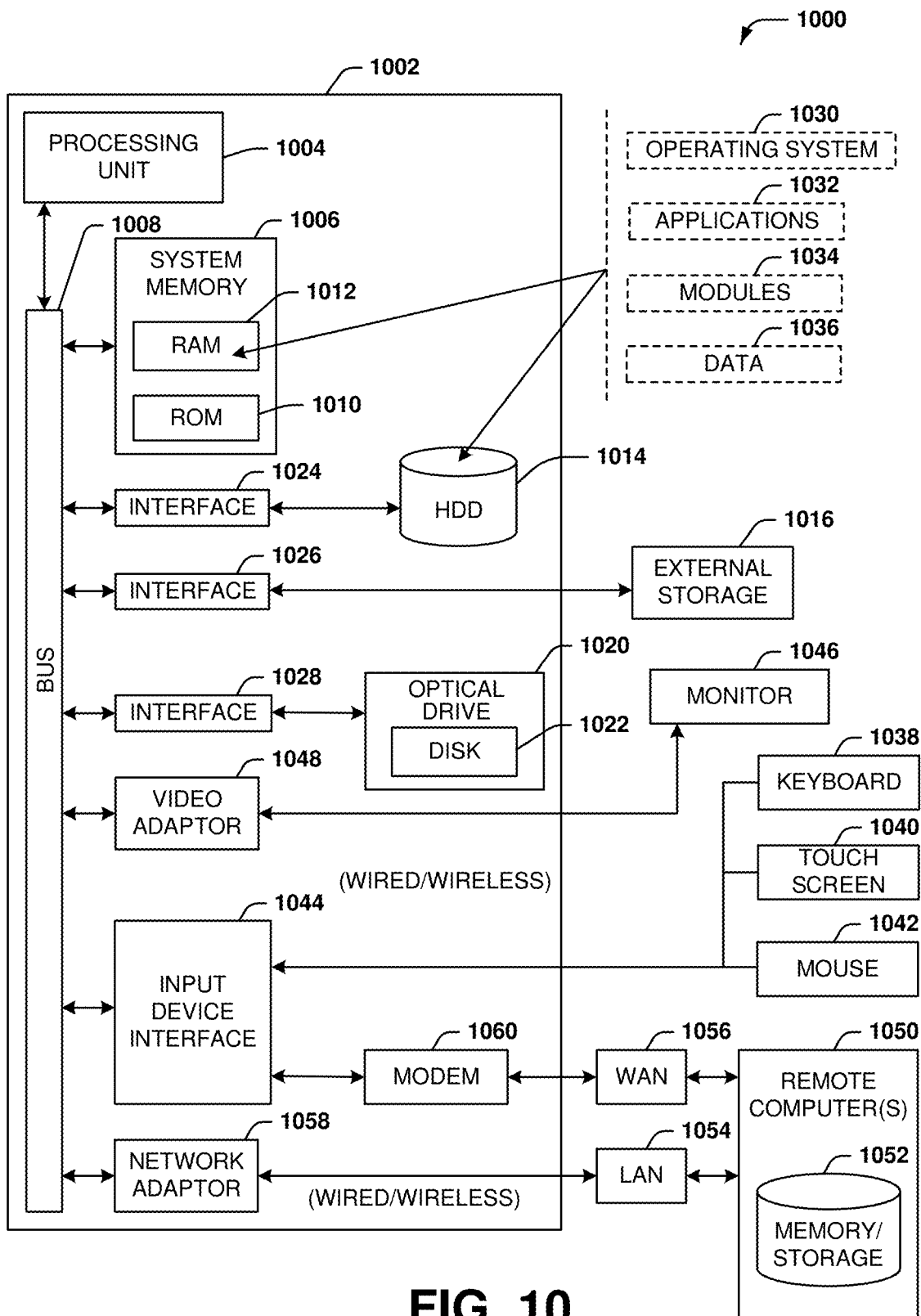
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a mobile subscriber device 221, a server 260, a computer 410, a map authority server 500, or other computing devices described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types.

Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a device comprising a processor, a map input from a user equipment, the map input comprising a map location and description information associated with the map location;
    determining, by the device, a map input credibility value for the map input, wherein the map input credibility value is determined based on an identity associated with the user equipment;
    in response to the map input credibility value being determined to be above a first threshold value, determining, by the device, a representative map input based on the map input and at least one other map input other than the map input;
    assigning, by the device, a representative credibility value to the representative map input, wherein the representative credibility value is based on the map input credibility value and at least one other map input credibility value of the at least one other map input; and
    in response to the representative credibility value being determined to be above a second threshold value, sending, by the device, the representative map input to multiple user equipment devices.

2. The method of claim 1, wherein the map input credibility value is determined based on proximity of a location of the user equipment with the map location included in the map input.

3. The method of claim 1, wherein the map input credibility value is determined based on a time difference between a first time included in the description information and a second time associated with a transmission of the map input.

4. The method of claim 1, wherein the identity is a first identity, and wherein the map input credibility value is determined based on whether the first identity associated with the user equipment matches a second identity accessible by the device.

5. The method of claim 4, wherein the map input credibility value is determined based on an identity credibility value assigned to the second identity accessible by the device.

6. The method of claim 5, further comprising updating, by the device, the identity credibility value based on the map input credibility value.

7. The method of claim 1, wherein the map input credibility value is determined based on an output of a comparison of the map input with profile information associated with the identity.

8. The method of claim 1, wherein the representative map input is based on a consensus of the map input and the at least one other map input.

9. The method of claim 1, further comprising sending, by the device, a monitoring request to at least one user equipment, wherein the monitoring request comprises a request for an update of the map input.

10. The method of claim 9, further comprising:
    receiving, by the device, from the at least one user equipment in response to the monitoring request, the update of the map input;
    modifying, by the device, the representative map input in response to the receiving the update of the map input; and
    sending, by the device, a modified representative map input to the multiple user equipment devices.

11. A device, comprising:
    a processor; and
    a memory that stores executable instructions that, when executed by the processor, facilitate performance of operations, comprising:
    receiving a first map input from a user equipment, the first map input comprising a map location and description information associated with the map location;
    determining a first map input credibility value for the first map input, wherein the first map input credibility value is determined based on proximity of a location of the user equipment with the map location included in the first map input;
    in response to the first map input credibility value being determined to be above a first threshold value, determining a representative map input based on the first map input and a second map input;
    assigning a representative credibility value to the representative map input, wherein the representative credibility value is based on the first map input credibility value and a second map input credibility value of the second map input; and in response to the representative credibility value being determined to be above a second threshold value, sending the representative map input to multiple user equipment devices.

12. The device of claim 11, wherein the map input credibility value is further based on a time difference between a first time included in the description information and a second time associated with a transmission of the first map input.

13. The device of claim 11, wherein the first map input credibility value is further based on an identity associated with the user equipment.

14. The device of claim 11, further comprising updating, based on the first map input credibility value, an identity credibility value of an identity associated with the user equipment.

15. The device of claim 11, wherein the representative credibility value comprises an average of the first map input credibility value and the second map credibility value.

16. The device of claim 11, wherein the representative credibility value comprises a mean of the first map input credibility value and the second map credibility value.

17. A non-transitory machine-readable medium, comprising executable instructions that, when executed by a processor, facilitate performance of operations, comprising:
receiving a map input from a user equipment, the map input comprising a map location and description information associated with the map location;
determining a map input credibility value for the map input, wherein the map input credibility value is determined based on a time difference between a first time included in the description information and a second time associated with a transmission of the map input;
in response to the map input credibility value being determined to be above a first threshold value, determining a representative map input based on the map input and another map input other than the map input;
assigning a representative credibility value to the representative map input, wherein the representative credibility value is based on the map input credibility value and another map input credibility value of the other map input; and
in response to the representative credibility value being determined to be above a second threshold value, sending the representative map input to multiple user equipment devices.

18. The non-transitory machine-readable medium of claim 17, wherein the map input credibility value is further based on an identity associated with the user equipment and a proximity of a location of the user equipment with the map location included in the map input.

19. The non-transitory machine-readable medium of claim 17, wherein the operations further comprise modifying the representative credibility value based on an agreement between the map input credibility value and the other map input credibility value.

20. The non-transitory machine-readable medium of claim 17, wherein the representative credibility value comprises an average or a mean of the map input credibility value and the other map credibility value.

* * * * *